United States Patent
Monde et al.

(10) Patent No.: US 8,571,789 B2
(45) Date of Patent: Oct. 29, 2013

(54) NAVIGATION SYSTEM

(75) Inventors: Yasuhiro Monde, Tokyo (JP); Katsuro Hayami, Tokyo (JP); Masatoshi Fujii, Tokyo (JP); Atsushi Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 860 days.

(21) Appl. No.: 12/601,732

(22) PCT Filed: Mar. 18, 2008

(86) PCT No.: PCT/JP2008/000632
§ 371 (c)(1),
(2), (4) Date: Nov. 24, 2009

(87) PCT Pub. No.: WO2009/004749
PCT Pub. Date: Jan. 8, 2009

(65) Prior Publication Data
US 2010/0185390 A1    Jul. 22, 2010

(30) Foreign Application Priority Data

Jul. 4, 2007   (JP) ................................ 2007-176512

(51) Int. Cl.
*G01C 21/00* (2006.01)
*G01C 21/34* (2006.01)
*G08G 1/123* (2006.01)

(52) U.S. Cl.
USPC ........... 701/409; 701/445; 701/414; 701/417; 340/995.25; 340/995.28

(58) Field of Classification Search
None
See application file for complete search history.

(56) References Cited

U.S. PATENT DOCUMENTS

| | | | | |
|---|---|---|---|---|
| 6,226,591 B1* | 5/2001 | Okumura et al. | | 701/409 |
| 6,289,278 B1* | 9/2001 | Endo et al. | | 701/431 |
| 6,453,235 B1* | 9/2002 | Endo et al. | | 701/428 |
| 6,473,693 B1* | 10/2002 | Kusama | | 701/436 |
| 2002/0111738 A1* | 8/2002 | Iwami et al. | | 701/211 |
| 2005/0086000 A1* | 4/2005 | Tsuchiya et al. | | 701/211 |
| 2005/0257994 A1* | 11/2005 | Fujita | | 180/446 |
| 2006/0287812 A1 | 12/2006 | Takashima | | |
| 2007/0021912 A1* | 1/2007 | Morita et al. | | 701/211 |
| 2007/0078594 A1* | 4/2007 | Mori | | 701/207 |
| 2007/0106467 A1* | 5/2007 | Sumizawa et al. | | 701/209 |

(Continued)

FOREIGN PATENT DOCUMENTS

| | | |
|---|---|---|
| CN | 1952827 A | 4/2007 |
| DE | 100 12 471 A1 | 9/2001 |
| DE | 10 2005 004 112 A1 | 8/2005 |
| JP | 2001-330454 A | 11/2001 |
| JP | 2005-291732 A | 10/2005 |

(Continued)

*Primary Examiner* — Tuan C. To
*Assistant Examiner* — Kevin P Mahne
(74) *Attorney, Agent, or Firm* — Birch, Stewart, Kolasch & Birch, LLP

(57) ABSTRACT

A navigation system includes: an angular velocity sensor 1 for detecting a change in an advancement direction of a vehicle; a vehicle azimuth calculation unit 13 for calculating a vehicle azimuth on the basis of angular velocity sensor information obtained from the angular velocity sensor; an on-board camera 2 for shooting a periphery of the vehicle; an image recognition unit 19 for recognizing an image obtained from the on-board camera; and an offset voltage correction unit 21 for performing a drift correction on the angular velocity sensor in accordance with an angle error between the vehicle azimuth calculated by the vehicle azimuth calculation unit and a vehicle azimuth determined from a white line on a road recognized by the image recognition unit.

2 Claims, 11 Drawing Sheets

(56) References Cited

U.S. PATENT DOCUMENTS

| | | |
|---|---|---|
| 2007/0118257 A1 | 5/2007 | Iida |
| 2007/0152804 A1* | 7/2007 | Breed et al. .................. 340/435 |
| 2008/0114544 A1* | 5/2008 | Liu et al. ..................... 701/213 |
| 2008/0123902 A1* | 5/2008 | Park et al. ................... 382/104 |
| 2008/0243378 A1* | 10/2008 | Zavoli ......................... 701/209 |

FOREIGN PATENT DOCUMENTS

| | | |
|---|---|---|
| JP | 2005-345240 A | 12/2005 |
| JP | 2006-153565 A | 6/2006 |
| JP | 2007-3286 A | 1/2007 |
| JP | 2007-139595 A | 6/2007 |
| JP | 2007-153031 A | 6/2007 |

* cited by examiner

FIG. 15
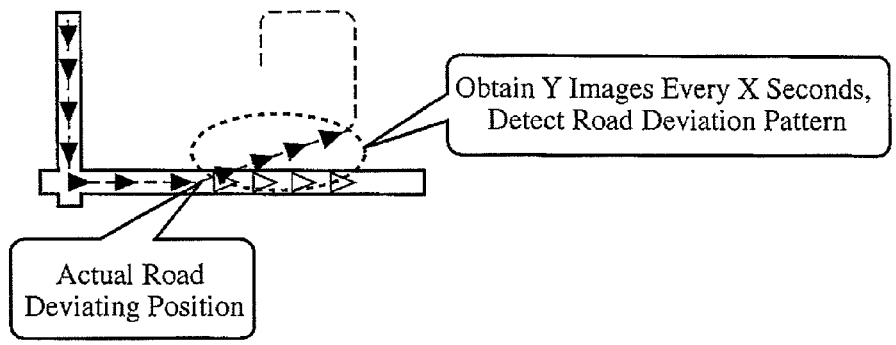
FIG. 16
(a) Near Expressway Ramp
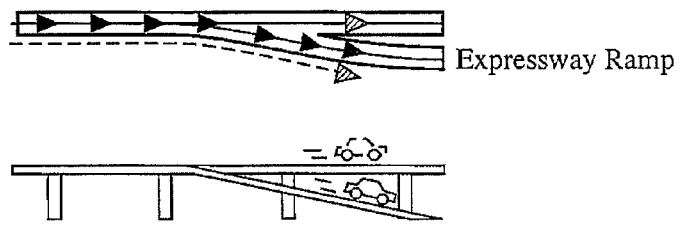
Expressway Ramp
(b) Between Expressway Entrance/Exit
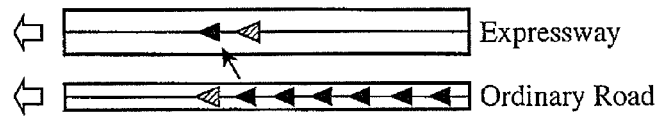
Expressway
Ordinary Road
FIG. 17
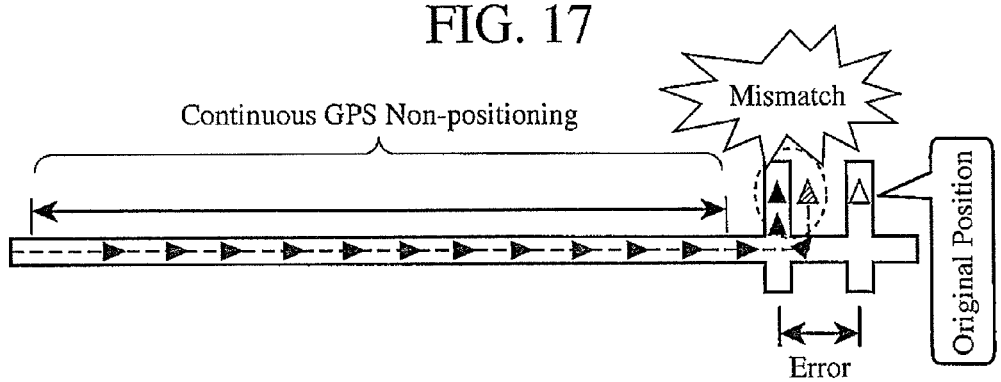

NAVIGATION SYSTEM

TECHNICAL FIELD

The present invention relates to a navigation system for guiding a user to a destination, and more specifically to a technique for improving positioning accuracy relating to a vehicle.

BACKGROUND ART

In recent years, vehicles including a rear view camera system that captures an image of the rear of the vehicle using a rear camera and displays the captured image have increased with the aim of ensuring safety during reversing the vehicle. Further, with increases in the number of buyers of luxury cars, on-board cameras including a rear camera are often provided as standard equipment in pre-installed navigation systems. Meanwhile, with advancements in image recognition technology, improvements have been made in image recognition precision.

Under these circumstances, cost competition has escalated, and in a positioning technology that is an essential function of a navigation system, there is a demand for a technique with which a high level of positioning accuracy can be secured using a lower cost sensor. When complicated road conditions exist, as in Japan, it is particularly difficult to guarantee 100% positioning accuracy. For example, in gaps between buildings, multistory parking lots, elevated roads and roads running underneath, multi-level interchanges, and so on, it may be still difficult to obtain a high level of positioning accuracy using current positioning technology.

As a technique relating to this positioning technology, Patent Document 1 discloses an on-board navigation device capable of detecting a vehicle position with a high level of accuracy even when a situation in which signal reception from GPS (Global Positioning System) satellites is difficult persists. In this on-board navigation device, when a broken line is laid on a traveling road along which the vehicle is traveling, an image including the broken line is shot or photographed by an on-board camera, whereupon a broken line interval of the broken line is measured by performing image recognition processing on the image shot by the on-board camera and a number of unit lines passed by the vehicle is counted. A traveled distance of the vehicle is then calculated on the basis of the broken unit line interval of the broken line and the number of passed unit lines, whereupon a vehicle position is corrected on the basis of the calculated traveled distance.

Patent Document 1: Japanese Unexamined Patent Application No. 2006-153565

As described above, although on-board cameras have substantially become standard equipment in recent navigation systems, positioning correction using the on-board camera is not yet satisfactory. Hence, there is demand for the development of a technique for obtaining a high level of positioning accuracy by performing positioning correction using the on-board camera.

DISCLOSURE OF THE INVENTION

The present invention has been made in response to the demands described above, and an object thereof is to provide a navigation system such that a high level of positioning accuracy can be obtained.

In order to solve the problems as described above, a navigation system according to the present invention includes: an angular velocity sensor for detecting a change in an advancing direction of a vehicle; a vehicle azimuth calculation unit for calculating a vehicle azimuth on the basis of angular velocity sensor information obtained from the angular velocity sensor; an on-board camera for shooting a periphery of the vehicle; an image recognition unit for recognizing an image obtained from the on-board camera; and an offset voltage correction unit for performing a drift correction on the angular velocity sensor in accordance with an angle error between the vehicle azimuth calculated by the vehicle azimuth calculation unit and a vehicle azimuth determined from a white line on a road recognized by the image recognition unit.

With the navigation system according to the present invention, a drift correction is performed on the angular velocity sensor in accordance with the angle error between the vehicle azimuth determined by the angular velocity sensor and the vehicle azimuth determined by recognizing an image from the on-board camera, and therefore correct angular velocity sensor information can be obtained from the angular velocity sensor at all times. As a result, a high level of positioning accuracy can be obtained.

BRIEF DESCRIPTION OF THE DRAWINGS

FIG. 15 is an illustrative view illustrating the correction processing on the basis of a road deviation determination that is executed in the navigation system in accordance with Embodiment 1 of the present invention;

FIG. 16 is an illustrative view illustrating the correction processing on the basis of a traveling road determination that is executed in the navigation system in accordance with Embodiment 1 of the present invention;

FIG. 17 is a view showing an example of a contributing factor requiring for the inter-intersection distance calculation executed in the navigation system in accordance with Embodiment 1 of the present invention;

BEST MODE FOR CARRYING OUT THE INVENTION

An embodiment of the present invention will be described in detail below with reference to the drawings.

Embodiment 1

Figure 1:
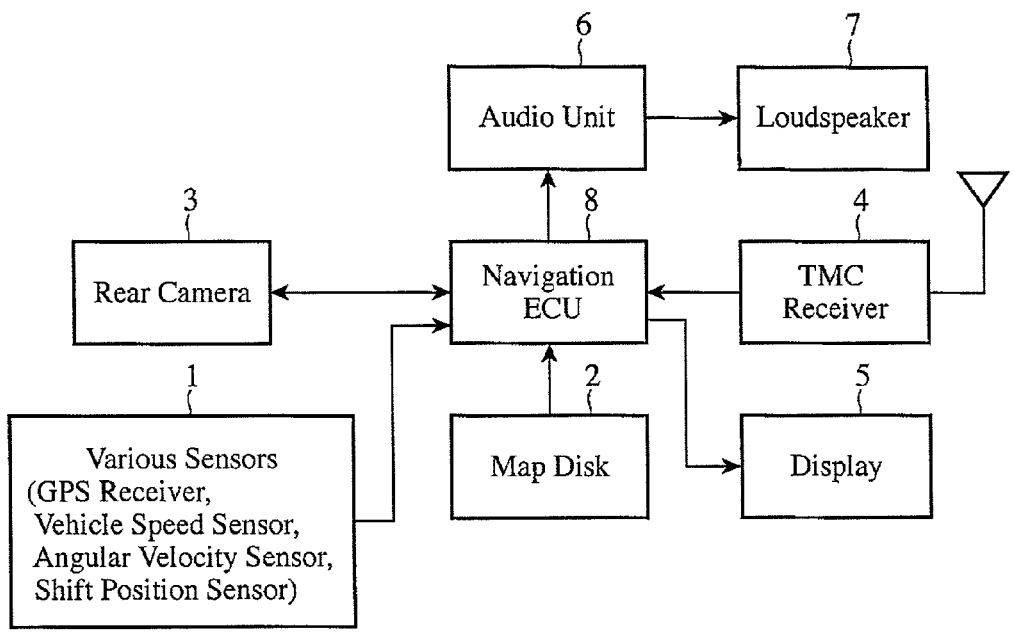
FIG. 1 is a block diagram showing the constitution of a navigation system in accordance with Embodiment 1 of the present invention.

A navigation system in accordance with Embodiment 1 is assumed to be provided with a "rear camera" serving as an on-board or on-vehicle camera, and to operate upon installation in a vehicle. FIG. 1 is a block diagram showing the overall constitution of the navigation system in accordance with Embodiment 1 of the present invention. The navigation system includes various sensors 1, a map disk 2, a rear camera 3, a TMC (Traffic Message Channel) receiver 4, a display 5, an audio unit 6, a loudspeaker 7, and a navigation ECU (Electronic Control Unit) 8.

The various sensors 1 include a GPS receiver, a vehicle speed sensor, an angular velocity sensor, a shift position sensor, and so on. The GPS receiver receives GPS signals from GPS satellites constituting a global positioning system, and detects its own current position on the basis of the received GPS signals. The current position detected by the GPS receiver is transmitted to the navigation ECU 8 as GPS information.

The vehicle speed sensor detects rotation of a vehicle wheel and generates a vehicle speed pulse corresponding to the rotation of the vehicle wheel. The vehicle speed pulse generated by the vehicle speed sensor is transmitted to the navigation ECU 8 as vehicle speed pulse information. The angular velocity sensor detects a change or variation in an advancing direction of the vehicle. A change in the advancing direction of the vehicle detected by the angular velocity sensor is transmitted to the navigation ECU 8 as angular velocity sensor information. The shift position sensor detects the position of a shift knob of the vehicle. The shift position detected by the shift position sensor is transmitted to the navigation ECU 8 as shift position information.

The map disk 2 is constituted by an HDD (Hard Disk Drive), for example, and stores map information. The map disk 2 corresponds to a map information storage unit of the present invention. Note that the map disk 2 may be constituted by a DVD (Digital Versatile Disk) drive. In this case, the map information is stored on a DVD inserted into the DVD drive. The map information stored on the map disk 2 is read by the navigation ECU 8.

The rear camera 3 corresponds to an on-board camera of the present invention, and shoots the rear of the vehicle when the vehicle reverses. More specifically, when the shift position information obtained from the shift position sensor of the vehicle indicates that the vehicle is reversing, or in other words that the shift knob is set in a reverse or back position, a power is supplied to the rear camera 3 through control by the navigation ECU 8, whereby the rear camera 3 shoots the rear of the vehicle. A rear camera image obtained by the rear camera 3 is transmitted to the navigation ECU 8.

The TMC receiver 4 corresponds to a TMC used in North America, Europe, and so on, for example, and receives traffic information, congestion information, and so on broadcast by FM multiplex broadcasting. The traffic information, congestion information, and so on received by the TMC receiver 4 are transmitted to the navigation ECU 8 as a reception signal.

The display 5 is constituted by a liquid crystal display device, for example, and displays a map, a vehicle position icon, a route to a destination, an image of the rear of the vehicle and various other information in accordance with display data transmitted from the navigation ECU 8. The audio unit 6 converts voice data transmitted from the navigation ECU 8 into an analog voice signal, and transmits the analog voice signal to the loudspeaker 7. The loudspeaker 7 outputs a guidance voice or the like, for example, in accordance with the voice signal transmitted from the audio unit 6.

Figure 2:
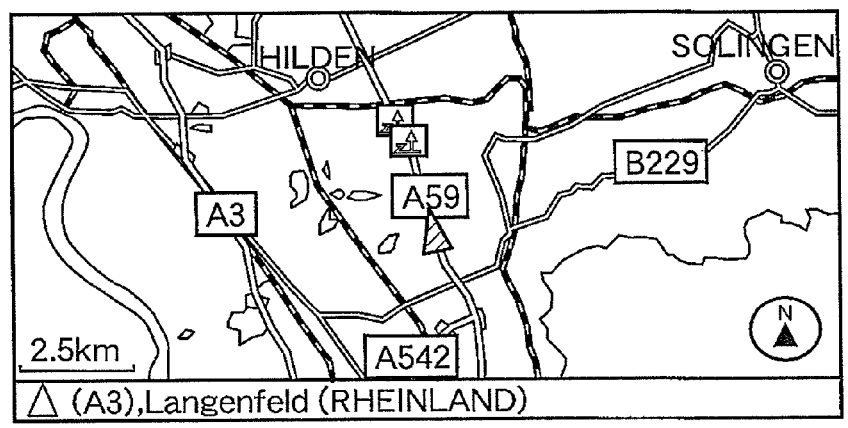
FIG. 2 is a view showing an example of a screen displayed by the navigation system in accordance with Embodiment 1 of the present invention.

The navigation ECU 8 is constituted by a microcomputer, for example, which performs overall control of the navigation system. For example, the navigation ECU 8 obtains the GPS information, vehicle speed pulse information, and angular velocity sensor information from the various sensors 1, and calculates a current position of the vehicle on the basis of this information. Further, the navigation ECU 8 calculates the current position of the vehicle on a map indicated by the map information read from the map disk 2, superimposes the current position of the vehicle on the map, and transmits the result to the display 5 as display data. As a result, an image in which a vehicle position icon (a triangular icon) is superimposed on a map, such as that shown in FIG. 2, for example, is displayed on a screen of the display 5.

Further, the navigation ECU 8 transmits the rear camera image transmitted from the rear camera 3 to the display 5. As a result, an image of the rear of the vehicle is displayed on the screen of the display 5. Furthermore, the navigation ECU 8 extracts a voice signal from the reception signal transmitted from the TMC receiver 4 and transmits the extracted voice signal to the audio unit 6 as voice data, and extracts an image signal from the reception signal and transmits the extracted image signal to the display 5. As a result, a voice describing the traffic information, congestion information, and so on is output from the loudspeaker 7, and subtitles describing the traffic information, congestion information, and so on are displayed on the screen of the display 5.

Figure 3:
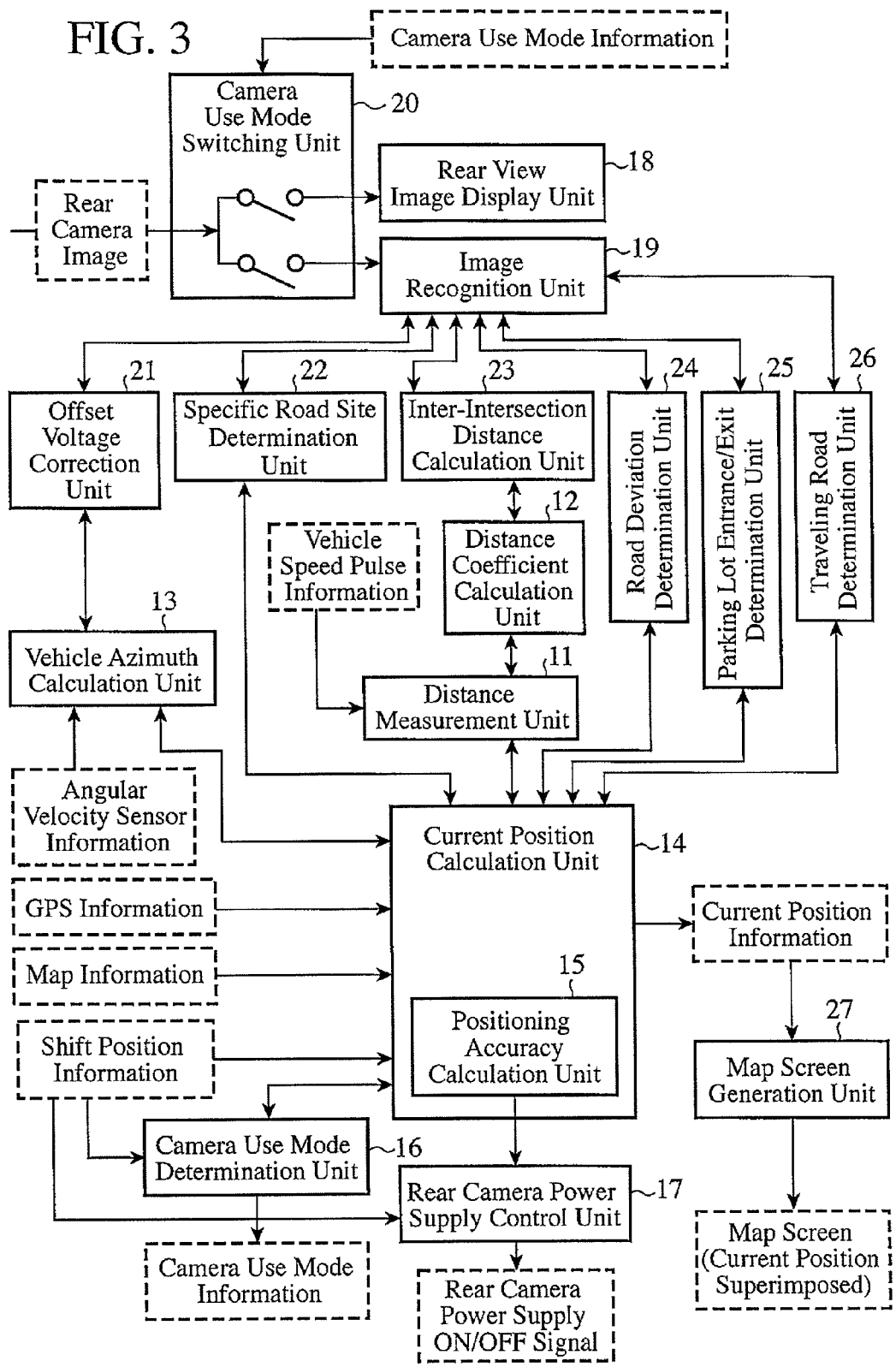
FIG. 3 is a block diagram showing the functional constitution of a navigation ECU used by the navigation system in accordance with Embodiment 1 of the present invention.

Next, the navigation ECU 8 will be described in detail. FIG. 3 is a block diagram showing the functional constitution of the navigation ECU 8. Note that in FIG. 3, parts surrounded by broken lines represent information input into and output from constitutional elements of the navigation ECU 8.

The navigation ECU 8 includes a distance measurement unit 11, a distance coefficient calculation unit 12, a vehicle azimuth calculation unit 13, a current position calculation unit 14, a positioning accuracy calculation unit 15, a camera use mode determination unit 16, a rear camera power supply control unit 17, a rear view image display unit 18, an image recognition unit 19, a camera use mode switching unit 20, an offset voltage correction unit 21, a specific road site determination unit 22, an inter-intersection distance calculation unit 23, a road deviation determination unit 24, a parking lot entrance/exit determination unit 25, a traveling road determination unit 26, and a map screen generation unit 27, all of which are constituted by software processing.

The distance measurement unit 11 measures a traveled distance of the vehicle from the vehicle speed pulse information obtained from the vehicle speed sensor included in the various sensors 1 using a vehicle speed pulse coefficient calculated by the distance coefficient calculation unit 12. The traveled distance measured by the distance measurement unit 11 is transmitted to the distance coefficient calculation unit 12 and the current position calculation unit 14 as distance information.

To convert the vehicle speed pulse information into an actual traveled distance, the distance coefficient calculation unit 12 calculates a vehicle speed pulse coefficient representing a distance advanced in a single revolution of the vehicle wheel on the basis of the current position calculated by the current position calculation unit 14. The vehicle speed pulse coefficient calculated by the distance coefficient calculation unit 12 is transmitted to the distance measurement unit 11 and the inter-intersection distance calculation unit 23.

The vehicle azimuth calculation unit 13 calculates a vehicle azimuth indicating the azimuth of an advancing direction of the vehicle on the basis of the angular velocity sensor information obtained from the angular velocity sensor included in the various sensors 1. The vehicle azimuth calculated by the vehicle azimuth calculation unit 13 is transmitted to the current position calculation unit 14 and the offset voltage correction unit 21 as vehicle azimuth information.

The current position calculation unit 14 calculates the current position of the vehicle on the basis of the GPS information obtained from the GPS receiver included in the various sensors 1, the vehicle azimuth information obtained from the vehicle azimuth calculation unit 13, the shift position information obtained from the shift position sensor of the vehicle, and the distance information obtained from the distance measurement unit 11, and also determines the current position by comparing the calculated current position with the map information read from the map disk 2. The current position determined by the current position calculation unit 14 is transmitted to the positioning accuracy calculation unit 15 and the map screen generation unit 27 as current position information.

The positioning accuracy calculation unit 15 is included in the current position calculation unit 14, and calculates the positioning accuracy of the determined current position. The positioning accuracy is affected by the GPS reception condition (satellite arrangement, the presence of continuous radio wave reception, the presence of a multi-path environment between buildings and so on), the traveling condition of the vehicle (vehicle turning at low speed), the condition of the road along which the vehicle is traveling (the presence of a parallel road, the presence of a narrow-angle fork), and so on. The positioning accuracy calculated by the positioning accuracy calculation unit 15 is transmitted to the rear camera power supply control unit 17 as positioning accuracy information.

The camera use mode determination unit 16 determines a camera use mode on the basis of the shift position information transmitted from the shift position sensor included in the various sensors 1 and the current position information transmitted from the current position calculation unit 14. Four modes, namely a "camera unused mode", a "rear view image display mode", an "image recognition mode", and a "rear view image display and image recognition mode", are defined as camera use modes. A determination result generated by the camera use mode determination unit 16 is transmitted to the camera use mode switching unit 20 as camera use mode information.

The rear camera power supply control unit 17 corresponds to an on-board camera power supply control unit of the present invention, and generates a rear camera power supply ON/OFF signal for ON/OFF-controlling the power supply of the rear camera 3 on the basis of the shift position information transmitted from the shift position sensor and the positioning accuracy information transmitted from the positioning accuracy calculation unit 15, and transmits the generated signal to the rear camera 3. More specifically, when the shift position information indicates that the vehicle is reversing and the positioning accuracy information indicates that the positioning accuracy is low, the rear camera power supply control unit 17 generates a rear camera power supply ON/OFF signal for switching the power supply of the rear camera 3 ON. Thus, trouble caused by continuous use of the rear camera 3 can be prevented, or in other words, the lifetime of the rear camera 3 can be extended.

The rear view image display unit 18 executes display processing for displaying an image of the rear of the vehicle on the display 5 on the basis of a rear camera image transmitted from the rear camera 3 via the camera use mode switching unit 20. Display data generated in the display processing performed by the rear view image display unit 18 are transmitted to the display 5. As a result, an image of the rear of the vehicle is displayed on the screen of the display 5.

The image recognition unit 19 recognizes an image pattern from the rear camera image transmitted from the rear camera 3 via the camera use mode switching unit 20. The image pattern recognized by the image recognition unit 19 is transmitted to the offset voltage correction unit 21, the specific road site determination unit 22, the inter-intersection distance calculation unit 23, the road deviation determination unit 24, the parking lot entrance/exit determination unit 25, and the traveling road determination unit 26.

The camera use mode switching unit 20 switches an output destination of the rear camera image in accordance with the camera use mode information transmitted from the camera use mode determination unit 16. With the camera use mode switching unit 20, the rear camera 3 can be used for image recognition purpose and also for other purposes.

The offset voltage correction unit 21 performs a drift correction on the angular velocity sensor in accordance with an angle error between the vehicle azimuth calculated by the vehicle azimuth calculation unit 13 and a vehicle azimuth determined from a white line detected thereby on a road recognized by the image recognition unit 19. In a gyro sensor used as the angular velocity sensor, a zero point voltage (the voltage at an angular velocity of zero) tends to shift according to temperature, and this phenomenon is known as a temperature drift. The offset voltage correction unit 21 corrects this temperature drift.

The specific road site determination unit 22 determines a railroad crossing or an underpass site of a multi-level interchange on the basis of the image pattern transmitted from the image recognition unit 19 and the current position information transmitted from the current position calculation unit 14 in order to correct the current position on the bases of a specific site on the road indicated by the map information read from the map disk 2. A determination result generated by the specific road site determination unit 22 is transmitted to the current position calculation unit 14.

To correct the vehicle speed pulse coefficient calculated by the distance coefficient calculation unit 12, the inter-intersection distance calculation unit 23 calculates an inter-intersection distance by detecting a plurality of intersection positions determined from the positions of pedestrian crossings obtained as image patterns from the image recognition unit 19 and comparing the vehicle speed pulse information to the map information. The inter-intersection distance calculated by the inter-intersection distance calculation unit 23 is transmitted to the distance coefficient calculation unit 12.

The road deviation determination unit 24 detects changes in the movement of traffic other than the vehicle on the periphery of the vehicle from the image pattern transmitted from the image recognition unit 19, or more specifically determines whether the image pattern indicates that the traffic is flowing in a longitudinal direction or a lateral direction, and determines whether or not the vehicle has deviated from the traveling road on the basis of the determined traffic movement change and the current position information transmitted from the current position calculation unit 14. A determination result generated by the road deviation determination unit 24 is transmitted to the current position calculation unit 14.

To correct the current position on the bases of an entrance/exit of a parking lot indicated by the map data read from the map disk 2, the parking lot entrance/exit determination unit 25 determines the presence of a specific object indicating a parking lot entrance/exit, for example a parking lot gate, a change in the brightness of the parking lot entrance/exit, or the like on the basis of the image pattern transmitted from the image recognition unit 19 and the current position information transmitted from the current position calculation unit 14. The determination result generated by the parking lot entrance/exit determination unit 25 is transmitted to the current position calculation unit 14.

To determine the traveling road during travel on a parallel road, the traveling road determination unit 26 determines the presence of a specific object indicating the road, for example a support column of an elevated road, illumination in a tunnel, a balustrade of a bridge, or the like on the basis of the image pattern transmitted from the image recognition unit 19 and the current position information transmitted from the current position calculation unit 14. A determination result generated by the traveling road determination unit 26 is transmitted to the current position calculation unit 14.

The map screen generation unit 27 generates a map screen on which the current position of the vehicle that is based on the current position information transmitted from the current position calculation unit 14, is superimposed onto a peripheral map. The map screen generated by the map screen generation unit 27 is transmitted to the display 5 as display data. As a result, a map screen on which the vehicle position icon is superimposed onto a map is displayed on the display 5.

Figure 4:
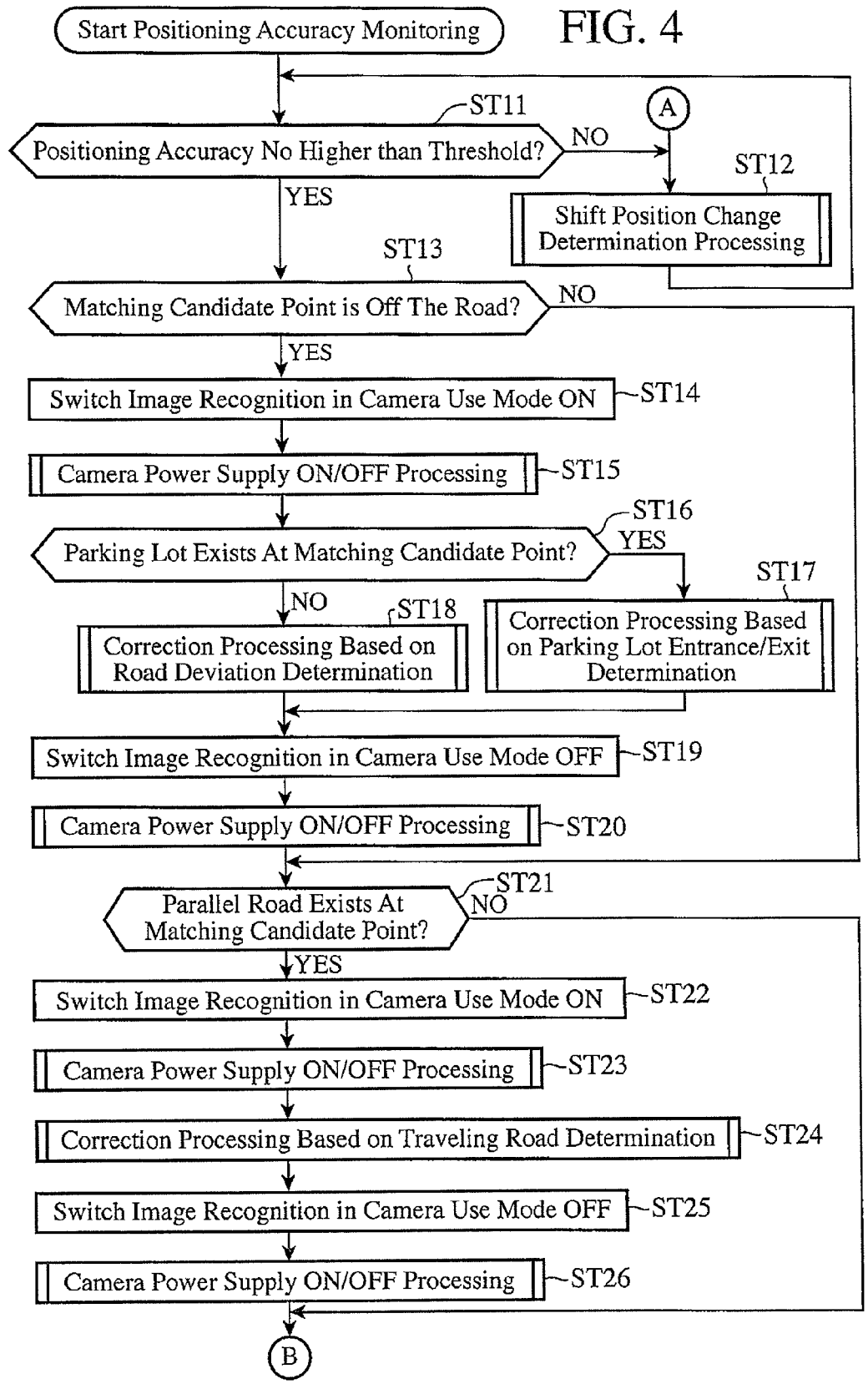
FIG. 4 is a flowchart (1) showing an operation of the navigation system in accordance with Embodiment 1 of the present invention, centering on positioning accuracy monitoring processing.
Figure 5:
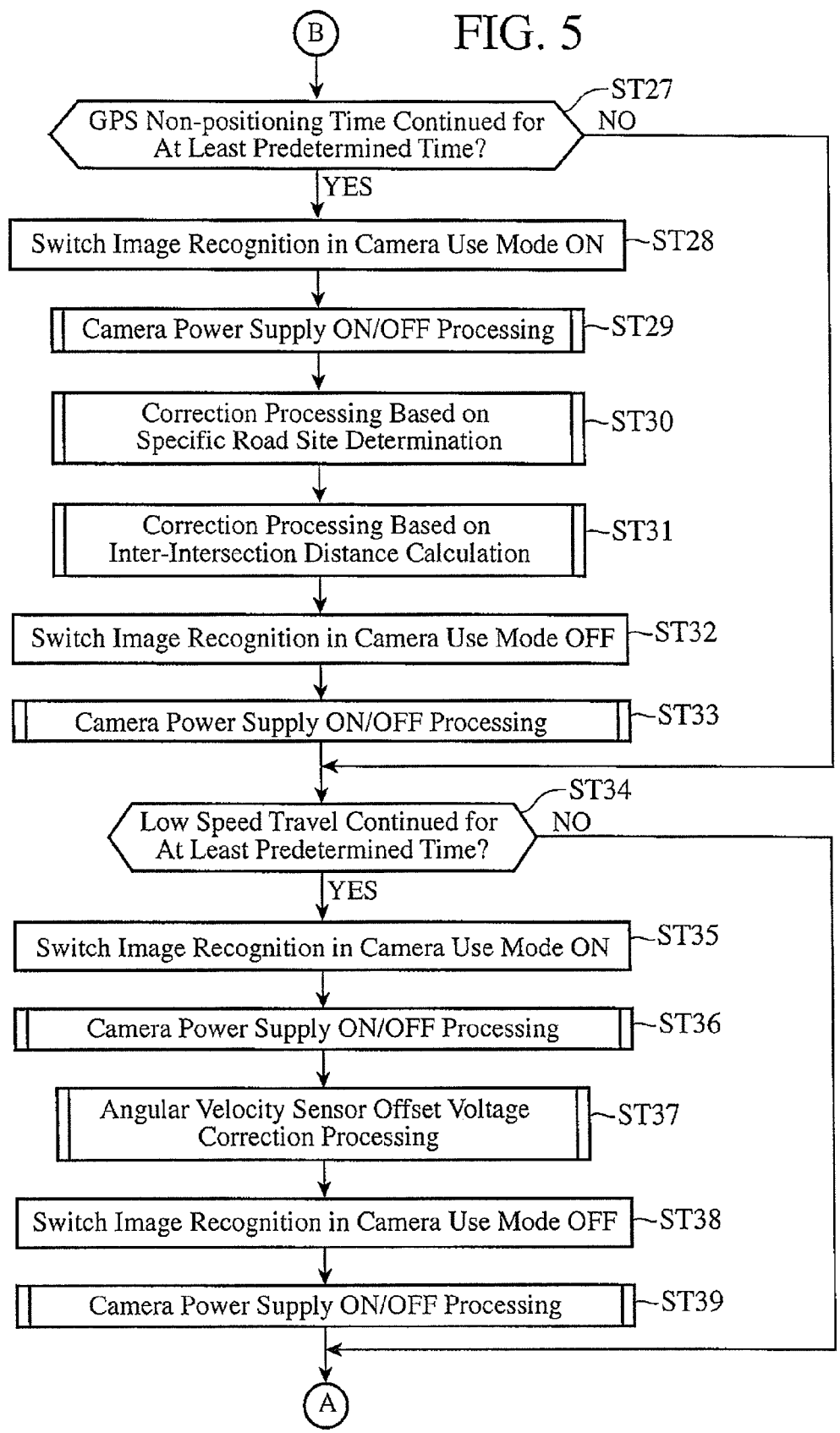
FIG. 5 is a flowchart (2) showing an operation of the navigation system in accordance with Embodiment 1 of the present invention, centering on positioning accuracy monitoring processing.

Next, an operation of the navigation system in accordance with Embodiment 1 of the present invention, constituted as described above, centering on positioning accuracy monitoring processing will be described with reference to a flowchart shown in FIG. 4.

When the positioning accuracy monitoring processing begins, first, a determination is made as to whether or not the positioning accuracy is equal to or lower than a predetermined threshold (step ST11). More specifically, a determination is made as to whether or not the positioning accuracy calculated by the positioning accuracy calculation unit 15 is higher than the predetermined threshold. When it is determined that the positioning accuracy is not equal to or lower than the predetermined threshold, or in other words higher than the predetermined threshold, in the step ST11, the positioning accuracy is acknowledged as being within an allowable range, and therefore shift position change determination processing is executed (step ST12). In the shift position change determination processing, processing is executed in accordance with the shift position in which the shift knob of the vehicle is set. This shift position change determination processing will be described in detail below. Next, the sequence returns to the step ST11, in which the processing described above is repeated.

When it is determined in the step ST11 that the positioning accuracy is equal to or lower than the predetermined threshold, the positioning accuracy is acknowledged as being outside the allowable range, and thereafter, processing is performed to improve the positioning accuracy. In this processing, first, a determination is made as to whether or not a matching candidate point is on the outside of the road (step ST13). More specifically, the current position calculation unit 14 calculates the current position of the vehicle on the basis of the GPS information obtained from the GPS receiver included in the various sensors 1, the vehicle azimuth information obtained from the vehicle azimuth calculation unit 13, the shift position information obtained from the shift position sensor, and the distance information obtained from the distance measurement unit 11, performs matching between the calculated current position of the vehicle and the road indicated by the map information read from the map disk 2, and determines whether or not a matching candidate point obtained in the matching exists on the outside of the road. When it is determined in the step ST13 that the matching candidate point is not on the outside of the road, or in other words that the matching candidate point is on the road, the sequence advances to a step ST21.

On the other hand, when it is determined in the step ST13 that the matching candidate point is on the outside of the road, image recognition in the camera use mode is switched ON (step ST14). More specifically, the camera use mode determination unit 16 switches the image recognition mode of the camera use mode ON, and transmits this to the camera use mode switching unit 20 as camera use mode information.

Next, camera power supply ON/OFF processing is executed (step ST15). In the camera power supply ON/OFF processing, the power supply of the rear camera 3 is controlled ON/OFF in accordance with the camera use mode. More specifically, when the image recognition mode or the rear view image display mode of the camera use mode is switched ON, the power supply of the rear camera 3 is switched ON, and in all other cases, the power supply of the rear camera 3 is switched OFF. At the point of execution of the step ST15, image recognition is ON, and therefore the power supply of the rear camera 3 is switched ON. This camera power supply ON/OFF processing will be described in detail below.

Next, a determination is made as to whether or not a parking lot exists at the matching candidate point (step ST16). More specifically, the current position calculation unit 14 determines whether or not a parking lot that is indicated by the map information read from the map disk 2 exists at the matching candidate point calculated in the step ST13. When it is determined in the step ST16 that a parking lot exists at the matching candidate point, correction processing on the basis of a parking lot entrance/exit determination is performed (step ST17). In the correction processing on the basis of a parking lot entrance/exit determination, processing is performed to correct the vehicle position by detecting the entrance or exit of the parking lot. The correction processing on the basis of a parking lot entrance/exit determination will be described in detail below. The sequence then advances to a step ST19.

When it is determined in the step ST16 that a parking lot does not exist at the matching candidate point, correction processing on the basis of a road deviation determination is performed (step ST18). In the correction processing on the basis of a road deviation determination, when the vehicle deviates from the traveling road, the current position of the vehicle is corrected to the outside of the road. The correction processing on the basis of a road deviation determination will be described in detail below. The sequence then advances to the step ST19.

In the step ST19, image recognition in the camera use mode is switched OFF. More specifically, the camera use mode determination unit 16 switches the image recognition mode of the camera use mode OFF, and transmits this to the camera use mode switching unit 20 as camera use mode information. Next, the camera power supply ON/OFF processing is executed (step ST20). The processing of the step ST20 is identical to the processing of the step ST15 described above, but at this time, image recognition is switched OFF, and therefore the power supply of the rear camera 3 is switched OFF. The sequence then advances to the step ST21.

In the step ST21, a determination is made as to whether or not a parallel road exists at the matching candidate point. More specifically, the current position calculation unit 14 calculates the current position of the vehicle on the basis of the GPS information obtained from the GPS receiver included in the various sensors 1, the vehicle azimuth information obtained from the vehicle azimuth calculation unit 13, the shift position information obtained from the shift position sensor, and the distance information obtained from the distance measurement unit 11, performs matching between the calculated current position of the vehicle and the road indicated by the map information read from the map disk 2, and determines whether or not a parallel road exists at the matching candidate point obtained in the matching. When it is determined in the step ST21 that a parallel road does not exist, the sequence advances to a step ST27.

On the other hand, when it is determined in the step ST21 that a parallel road does exist, image recognition in the camera use mode is switched ON (step ST22). The processing of the step ST22 is identical to the processing of the step ST14 described above. Next, the camera power supply ON/OFF processing is executed (step ST23). The processing of the step ST23 is identical to the processing of the step ST15 described above, and in this processing, the power supply of the rear camera 3 is switched ON.

Next, correction processing on the basis of a traveling road determination is performed (step ST24). More specifically, the traveling road determination unit 26 detects a specific object indicating the parallel road, and corrects the matching position in accordance with the detection result. The correction processing on the basis of a traveling road determination will be described in detail below. Next, image recognition in the camera use mode is switched OFF (step ST25). The processing of the step ST25 is identical to the processing of the step ST19 described above. Next, the camera power supply ON/OFF processing is executed (step ST26). The processing of the step ST26 is identical to the processing of the step ST20 described above. In this processing, the power supply of the rear camera 3 is switched OFF. The sequence then advances to the step ST27.

In the step ST27, a determination is made as to whether or not a GPS non-positioning time has continued for at least a predetermined time. More specifically, the current position calculation unit 14 determines whether or not the GPS information transmitted from the GPS receiver of the various sensors 1 indicates that it has been impossible to receive GPS signals continuously for at least the predetermined time. When it is determined in the step ST27 that the GPS non-positioning time has not continued for at least the predetermined time, or in other words that it has been possible to receive GPS signals continuously, the sequence advances to a step ST34.

On the other hand, when it is determined in the step ST27 that the GPS non-positioning time has continued for at least the predetermined time, image recognition in the camera use mode is switched ON (step ST28). The processing of the step ST28 is identical to the processing of the step ST14 described above. Next, the camera power supply ON/OFF processing is executed (step ST29). The processing of the step ST29 is identical to the processing of the step ST15 described above. In this processing, the power supply of the rear camera 3 is switched ON.

Next, correction processing on the basis of a specific road site determination is performed (step ST30). More specifically, when the GPS non-positioning time has continued for at least the predetermined time, it may be assumed that the positioning accuracy has decreased, and therefore the specific road site determination unit 22 detects a specific road site and corrects the current position in accordance with the detection result. The correction processing on the basis of a specific road site determination will be described in detail below.

Next, correction processing on the basis of an inter-intersection distance calculation is performed (step ST31). More specifically, the inter-intersection distance calculation unit 23 detects the inter-intersection distance and corrects the current position of the vehicle and the vehicle speed pulse coefficient in accordance with the detection result. The correction processing on the basis of an inter-intersection distance calculation will be described in detail below.

Next, image recognition in the camera use mode is switched OFF (step ST32). The processing of the step ST32 is identical to the processing of the step ST19 described above. Next, the camera power supply ON/OFF processing is executed (step ST33). The processing of the step ST33 is identical to the processing of the step ST20 described above. The sequence then advances to the step ST34.

In the step ST34, a determination is made as to whether or not low speed travel has continued for at least a predetermined time. When it is determined in the step ST34 that low speed travel has not continued for at least the predetermined time, the sequence returns to the step ST12, in which the processing described above is repeated. When it is determined in the step ST34 that low speed travel has continued for at least the predetermined time, on the other hand, it is acknowledged that the offset voltage of the angular velocity sensor has become unstable and that the reliability of the angular velocity sensor information has decreased, and therefore angular velocity sensor offset voltage correction processing is performed. More specifically, first, image recognition in the camera use mode is switched ON (step ST35). The processing of the step ST35 is identical to the processing of the step ST14 described above. Next, the camera power supply ON/OFF processing is executed (step ST36). The processing of the step ST36 is identical to the processing of the step ST15 described above. In this processing, the power supply of the rear camera 3 is switched ON.

Next, angular velocity sensor offset voltage correction processing is executed (step ST37). More specifically, the offset voltage correction unit 21 corrects the offset voltage of the gyro sensor constituting the angular velocity sensor. The angular velocity sensor offset voltage correction processing will be described in detail below.

Next, image recognition in the camera use mode is switched OFF (step ST38). The processing of the step ST38 is identical to the processing of the step ST19 described above. Next, the camera power supply ON/OFF processing is executed (step ST39). The processing of the step ST39 is identical to the processing of the step ST20 described above. The sequence then returns to the step ST12, in which the processing described above is repeated.

(1) Shift Position Change Determination Processing

Figure 6:
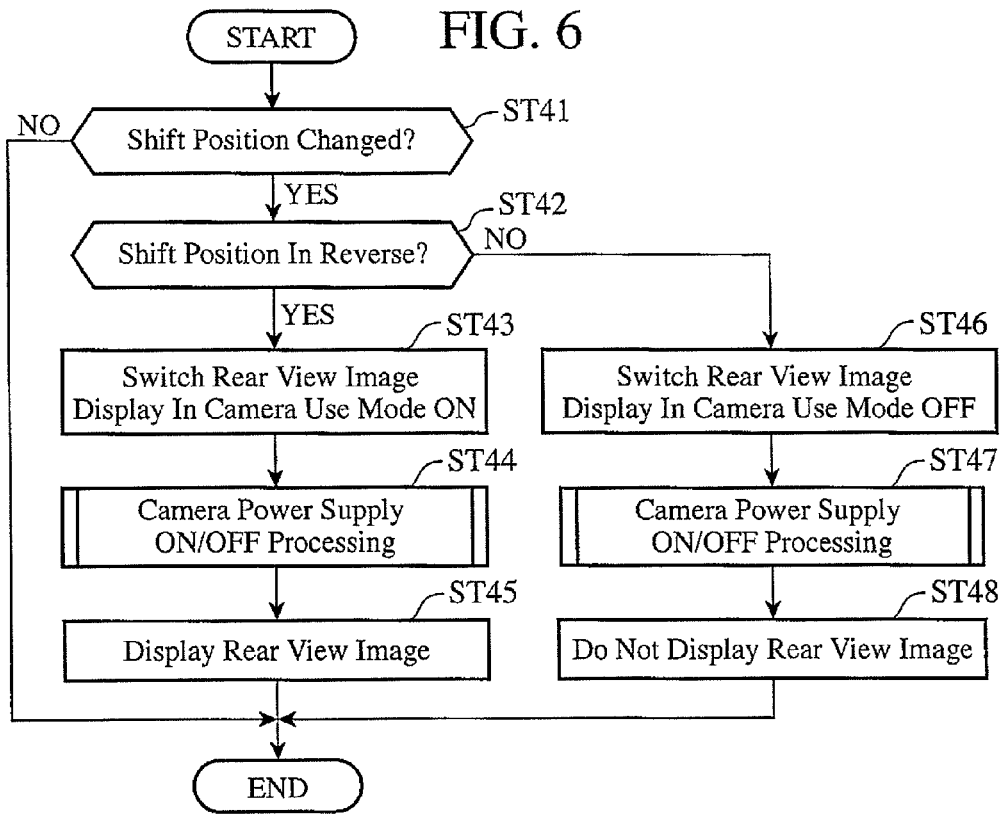
FIG. 6 is a flowchart showing in detail shift position change determination processing that is executed in the navigation system in accordance with Embodiment 1 of the present invention.

Next, the shift position change determination processing executed in the step ST12 of the positioning accuracy monitoring processing described above will be described in detail with reference to a flowchart shown in FIG. 6. In the shift position change determination processing, first, a determination is made as to whether or not the shift position has changed or varied (step ST41). More specifically, the camera use mode determination unit 16 determines whether or not the shift position indicated by the shift position information transmitted from the shift position sensor of the vehicle has changed.

When it is determined in the step ST41 that the shift position has not changed, the shift position change determination processing is completed. When it is determined in the step ST41 that the shift position has changed, on the other hand, a determination is made as to whether or not the shift position is set in reverse (step ST42). More specifically, the camera use mode determination unit 16 determines whether or not the shift position indicated by the shift position information is set in reverse.

When it is determined in the step ST42 that the shift position is set in reverse, rear view image display in the camera use mode is switched ON (step ST43). More specifically, the camera use mode determination unit 16 switches the rear view image display mode of the camera use mode ON, and transmits this to the camera use mode switching unit 20 as camera use mode information.

Next, the camera power supply ON/OFF processing is executed (step ST44). More specifically, when the shift position information transmitted from the shift position sensor indicates reverse and the positioning accuracy information transmitted from the positioning accuracy calculation unit 15 indicates that the positioning accuracy is equal to or lower than the predetermined threshold, the rear camera power supply control unit 17 generates a rear camera power supply ON/OFF signal for switching the power supply of the rear camera 3 ON, and transmits the generated signal to the rear camera 3. As a result, the power supply of the rear camera 3 is switched ON, and a rear camera image is transmitted to the camera use mode switching unit 20 from the rear camera 3.

Next, a rear view image is displayed (step ST45). More specifically, since the camera use mode information transmitted from the camera use mode determination unit 16 indicates that the rear view image display mode is ON, the camera use mode switching unit 20 switches the camera use mode such that a rear camera image transmitted from the rear camera 3 is transmitted to the rear view image display unit 18. Accordingly, the rear view image display unit 18 executes display processing to display an image of the rear of the vehicle on the display 5 on the basis of the rear camera image transmitted from the rear camera 3 via the camera use mode switching unit 20, and transmits a processing result to the display 5 as display data. As a result, an image of the rear of the vehicle is displayed on the screen of the display 5. The shift position change determination processing is then completed.

When it is determined in the step ST42 that the shift position is not set in reverse, rear view image display in the camera use mode is switched OFF (step ST46). More specifically, the camera use mode determination unit 16 switches the rear view image display mode of the camera use mode OFF, and transmits this to the camera use mode switching unit 20 as camera use mode information.

Next, the camera power supply ON/OFF processing is executed (step ST47). More specifically, when the shift position information transmitted from the shift position sensor does not indicate reverse or the positioning accuracy information transmitted from the positioning accuracy calculation unit 15 indicates that the positioning accuracy is higher than the predetermined threshold, the rear camera power supply control unit 17 generates a rear camera power supply ON/OFF signal for switching the power supply of the rear camera 3 OFF, and transmits the generated signal to the rear camera 3. As a result, the power supply of the rear camera 3 is switched OFF.

Next, the rear view image is switched to non-display (step ST48). More specifically, since the camera use mode information transmitted from the camera use mode determination unit 16 indicates that the rear view image display mode is OFF, the camera use mode switching unit 20 switches the camera use mode to the camera unused mode. As a result, the processing for transmitting the rear camera image to the rear view image display unit 18 is halted. The shift position change determination processing is then completed.

(2) Camera Power Supply ON/OFF Processing

Figure 7:
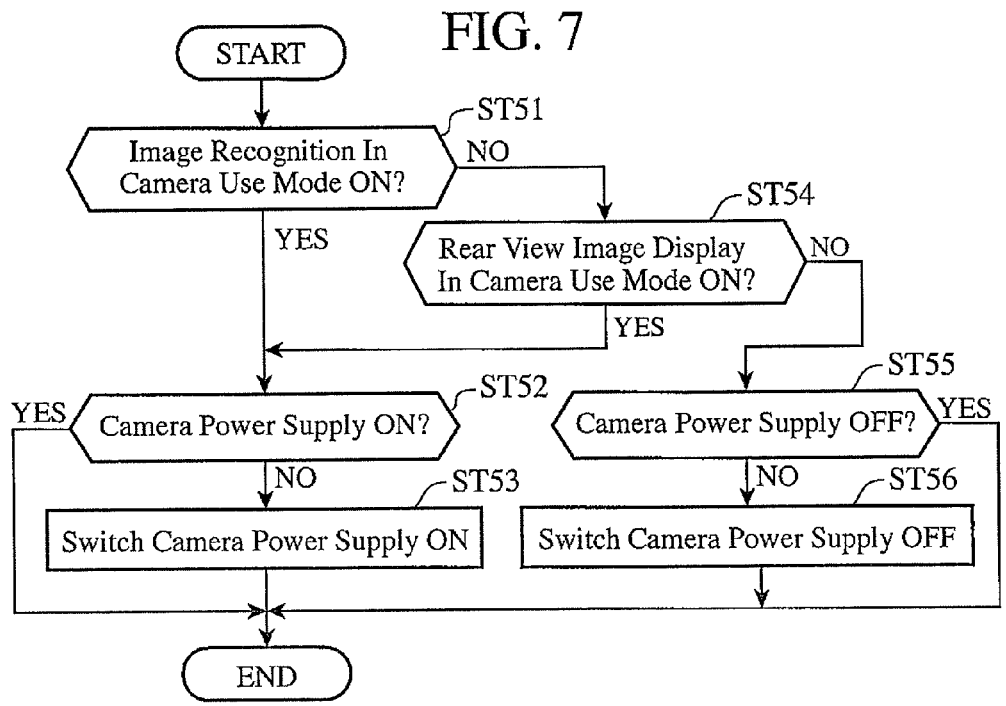
FIG. 7 is a flowchart showing in detail camera power supply ON/OFF processing that is executed in the navigation system in accordance with Embodiment 1 of the present invention.

Next, the camera power supply ON/OFF processing executed in the steps ST15, ST20, ST23, ST26, ST29, ST33, ST36 and ST39 of the positioning accuracy monitoring processing described above will be described in detail with reference to a flowchart shown in FIG. 7. First, in the camera power supply ON/OFF processing, a determination is made as to whether or not image recognition in the camera use mode is ON (step ST51). More specifically, the rear camera power supply control unit 17 determines whether or not the image recognition mode of the camera use mode is ON. When it is determined in the step ST51 that image recognition in the camera use mode is ON, a determination is made as to whether or not the camera power supply is ON (step ST52). More specifically, the rear camera power supply control unit 17 determines whether or not the power supply of the rear camera 3 has already been switched ON.

When it is determined in the step ST52 that the camera power supply is ON, the camera power supply ON/OFF processing is completed. When it is determined in the step ST52 that the camera power supply is not ON, on the other hand, the camera power supply is switched ON (step ST53). More specifically, the rear camera power supply control unit 17 generates a rear camera power supply ON/OFF signal for switching the power supply of the rear camera 3 ON, and transmits the generated signal to the rear camera 3. As a result, power is supplied to the rear camera 3. The camera power supply ON/OFF processing is then completed.

When it is determined in the step ST51 that image recognition in the camera use mode is not ON, a determination is made as to whether or not rear view image display in the camera use mode is ON (step ST54). More specifically, the rear camera power supply control unit 17 determines whether or not the rearview image display mode of the camera use mode is ON.

When it is determined in the step ST54 that rear view image display in the camera use mode is ON, the sequence advances to the step ST52, in which the processing described above is performed. When it is determined in the step ST54 that rear view image display in the camera use mode is not ON, on the other hand, a determination is made as to whether or not the camera power supply is OFF (step ST55). More specifically, the rear camera power supply control unit 17 determines whether or not the power supply of the rear camera 3 has already been switched OFF.

When it is determined in the step ST55 that the camera power supply is OFF, the camera power supply ON/OFF processing is completed. When it is determined in the step ST55 that the camera power supply is not OFF, on the other hand, the camera power supply is switched OFF (step ST56). More specifically, the rear camera power supply control unit 17 generates a rear camera power supply ON/OFF signal for switching the power supply of the rear camera 3 OFF, and transmits the generated signal to the rear camera 3. As a result, the power supply of the rear camera 3 is switched OFF. The camera power supply ON/OFF processing is then completed. The processing described above realizes a function for switching the power supply of the rear camera 3 ON when the image recognition mode or the rear view image display mode of the camera use mode is ON and switching the power supply of the rear camera 3 OFF in all other cases.

Figure 8:
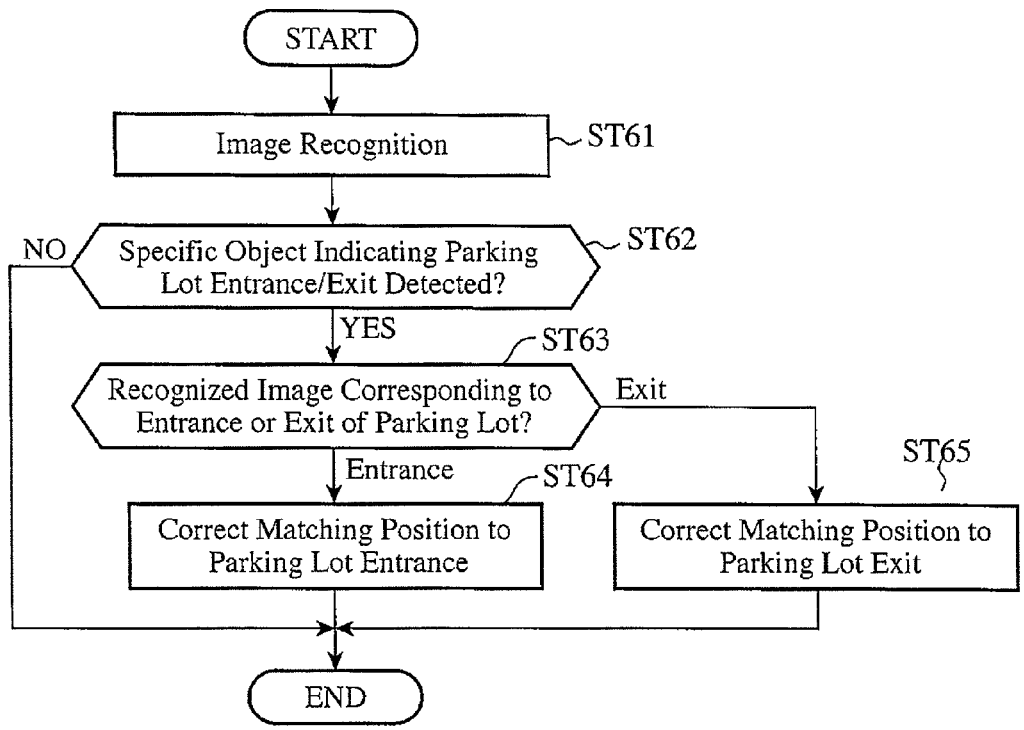
FIG. 8 is a flowchart showing in detail correction processing on the basis of a parking lot entrance/exit determination that is executed in the navigation system in accordance with Embodiment 1 of the present invention.
Figure 14:
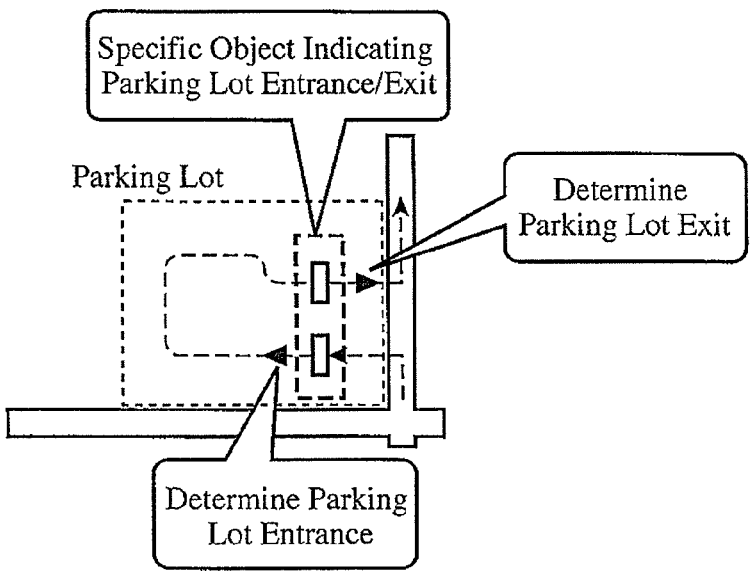
FIG. 14 is an illustrative view illustrating the correction processing on the basis of a parking lot entrance/exit determination that is executed in the navigation system in accordance with Embodiment 1 of the present invention.

(3) Correction Processing on the Basis of a Parking Lot Entrance/Exit Determination Next, the correction processing on the basis of a parking lot entrance/exit determination that is executed in the step ST17 of the positioning accuracy monitoring processing described above, will be described in detail with reference to a flowchart shown in FIG. 8 and an illustrative view shown in FIG. 14. First, in the correction processing on the basis of a parking lot entrance/exit determination, image recognition is performed (step ST61). More specifically, the image recognition unit 19 recognizes an image pattern from the rear camera image transmitted from the rear camera 3 via the camera use mode switching unit 20. The image pattern recognized by the image recognition unit 19 is transmitted to the parking lot entrance/exit determination unit 25.

Next, a determination is made as to whether or not a specific object indicating a parking lot entrance/exit has been detected (step ST62). More specifically, the parking lot entrance/exit determination unit 25 determines whether or not the image pattern transmitted from the image recognition unit 19 indicates a specific object indicating a parking lot entrance/exit. When it is determined in the step ST62 that a specific object indicating a parking lot entrance/exit has not been detected, the correction processing on the basis of a parking lot entrance/exit determination is completed.

When it is determined in the step ST62 that a specific object indicating a parking lot entrance/exit has been detected, on the other hand, a determination is made as to whether the recognized image is a parking lot entrance or a parking lot exit (step ST63). More specifically, the parking lot entrance/exit determination unit 25 determines whether the image pattern transmitted from the image recognition unit 19 indicates an entrance to a parking lot or an exit from a parking lot. As shown in FIG. 14, for example, when an image pattern of a parking lot gate is transmitted from the image recognition unit 19 while the current position indicated by the current position information transmitted from the current position calculation unit 14 indicates that the vehicle is inside of a parking lot indicated by the map information read from the map disk 2, the parking lot entrance/exit determination unit 25 determines a parking lot entrance, and when an image pattern of a parking lot gate is transmitted from the image recognition unit 19 while the current position indicates that the vehicle is outside of the parking lot, the parking lot entrance/exit determination unit 25 determines a parking lot exit.

When a parking lot entrance is determined in the step ST63, the matching position is corrected to the parking lot entrance (step ST64). More specifically, the current position calculation unit 14 corrects the current position of the vehicle that is calculated on the basis of the GPS information obtained from the GPS receiver included in the various sensors 1, the vehicle azimuth information obtained from the vehicle azimuth calculation unit 13, the shift position information obtained from the vehicle, and the distance information obtained from the distance measurement unit 11, to the entrance of the parking lot indicated by the map information read from the map disk 2. The correction processing on the basis of a parking lot entrance/exit determination is then completed.

On the other hand, when a parking lot exit is determined in the step S63, the matching position is corrected to the parking lot exit (step ST65). More specifically, the current position calculation unit 14 corrects the current position of the vehicle that is calculated on the basis of the GPS information obtained from the GPS receiver included in the various sensors 1, the vehicle azimuth information obtained from the vehicle azimuth calculation unit 13, the shift position information obtained from the vehicle, and the distance information obtained from the distance measurement unit 11, to the exit of the parking lot indicated by the map information read from the map disk 2. The correction processing on the basis of a parking lot entrance/exit determination is then completed.

In the correction processing on the basis of a parking lot entrance/exit determination described above, the current position of the vehicle is corrected by detecting the entrance or exit of an actual parking lot, and therefore the positioning accuracy of the navigation system can be improved.

(4) Correction Processing on the Basis of a Road Deviation Determination

Figure 9:
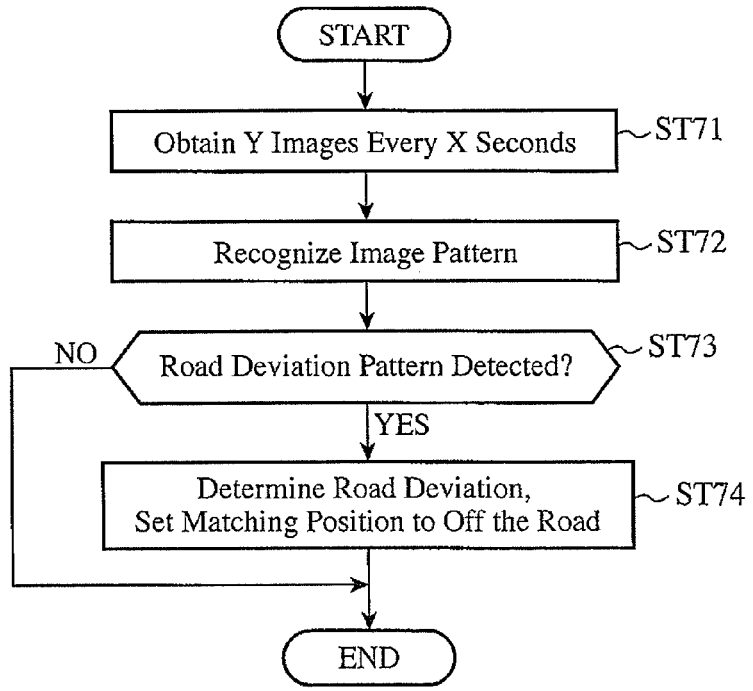
FIG. 9 is a flowchart showing in detail correction processing on the basis of a road deviation determination that is executed in the navigation system in accordance with Embodiment 1 of the present invention.

Next, the correction processing on the basis of a road deviation determination that is executed in the step ST18 of the positioning accuracy monitoring processing described above, will be described in detail with reference to a flowchart shown in FIG. 9 and an illustrative view shown in FIG. 15. FIG. 15 is a view showing a relationship between the current position information for display that is calculated in the current position calculation unit 14, and a candidate point at the time of a road deviation.

First, in the correction processing on the basis of a road deviation determination, Y (Y being an arbitrary integer) images are obtained every X (X being an arbitrary integer) seconds (step ST71). More specifically, the image recognition unit 19 obtains Y rear camera images every X seconds from the rear camera 3 via the camera use mode switching unit 20, and executes image recognition processing. Image patterns obtained in the recognition processing are transmitted to the road deviation determination unit 24.

Next, image pattern recognition is performed (step ST72). More specifically, the road deviation determination unit 24 detects a change in the movement of traffic other than the vehicle on the periphery or surroundings of the vehicle that is indicated by the Y image patterns obtained from the image recognition unit 19, or more specifically determines whether the traffic other than the vehicle is flowing in a longitudinal direction or a lateral direction, and when the traffic is determined to be flowing in the lateral direction, the road deviation determination unit 24 detects this as a road deviation pattern such as that shown in FIG. 15. Accordingly, it is readily understood that the aforementioned image recognition processing that is executed by the image recognition unit 19 on the Y rear camera images must be capable of recognizing the specific types of objects (i.e., other vehicles) which constitute the traffic other than the vehicle in which the navigation system of the present invention is implemented.

Next, a determination is made as to whether or not a road deviation pattern has been detected (step ST73). More specifically, when the Y image patterns obtained from the image recognition unit 19 indicate that the traffic (that is constituted by the other vehicles recognized by the image recognition) is flowing in the longitudinal direction, the road deviation determination unit 24 determines that a road deviation pattern has not been detected, and when the Y image patterns indicate that the traffic is flowing in the lateral direction, the road deviation determination unit 24 determines that a road deviation pattern has been detected. In this case, as shown in FIG. 15, a point at which the traffic begins to flow in the lateral direction is determined to be an actual road deviation position.

When it is determined in the step ST73 that a road deviation pattern has not been detected, the correction processing on the basis of a road deviation determination is completed. When it is determined in the step ST73 that a road deviation pattern has been detected, on the other hand, the vehicle is determined to have deviated from the road, and the matching position is set on the outside of the road (step ST74). More specifically, when the road deviation determination unit 24 determines that the vehicle has deviated from the traveling road on the basis of the recognized traffic movement change and the current position information transmitted from the current position calculation unit 14, it transmits a corresponding determination result to the current position calculation unit 14. In accordance with the determination result transmitted from the road deviation determination unit 24, the current position calculation unit 14 corrects the current position of the vehicle to the outside of the road. The correction processing on the basis of a road deviation determination is then completed.

In the correction processing on the basis of a road deviation determination described above, the current position of the vehicle is corrected to the outside of the road when the vehicle deviates from the road, and therefore the positioning accuracy of the navigation system can be improved.

(5) Correction Processing on the Basis of a Traveling Road Determination

Figure 10:
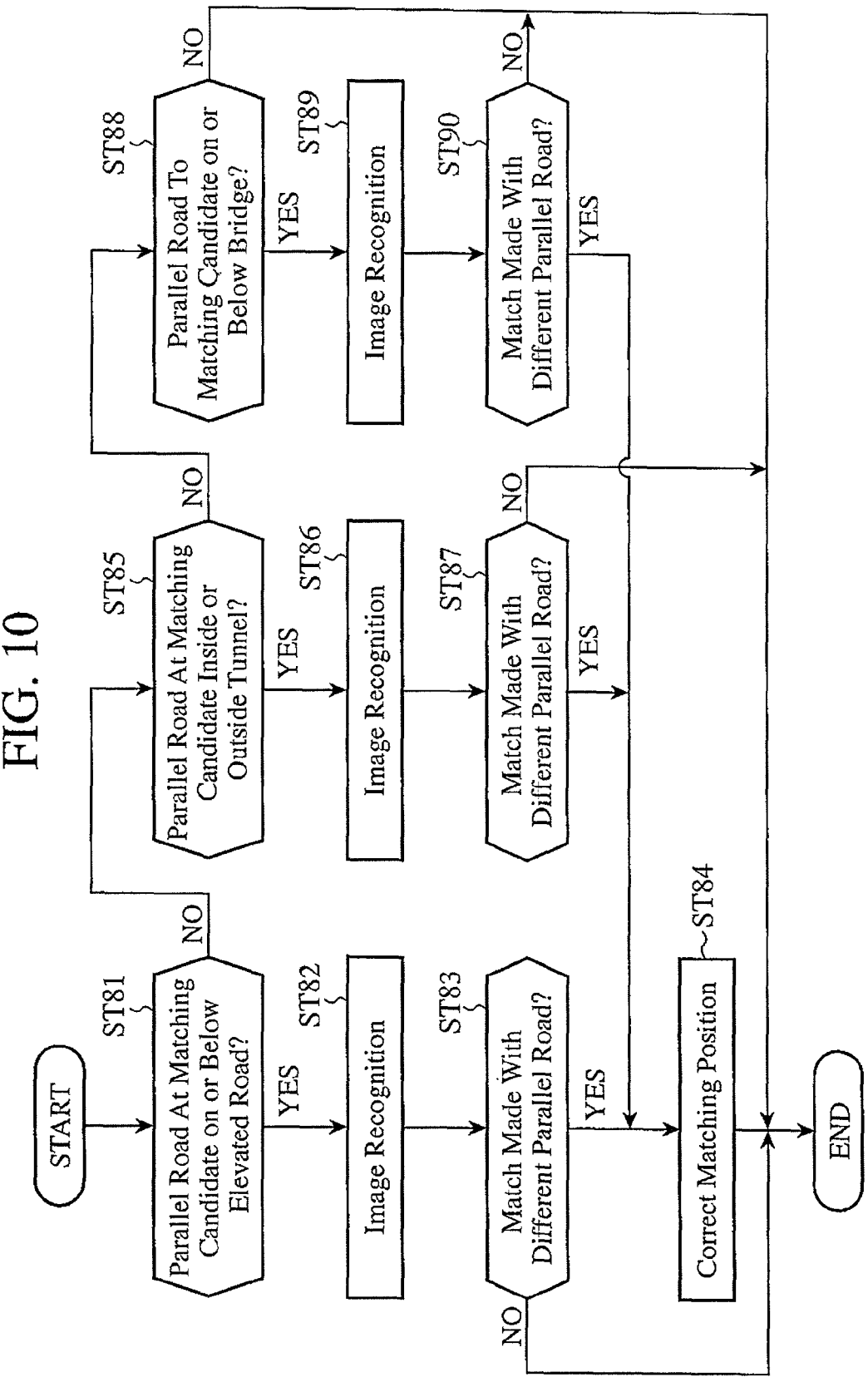
FIG. 10 is a flowchart showing in detail correction processing on the basis of a traveling road determination that is executed in the navigation system in accordance with Embodiment 1 of the present invention.

Next, the correction processing on the basis of a traveling road determination that is executed in the step ST24 of the positioning accuracy monitoring processing described above, will be described in detail with reference to a flowchart shown in FIG. 10 and an illustrative view shown in FIG. 16. FIG. 16 is a view showing an example of a contributing factor requiring correction processing on the basis of a traveling road determination, and an operation image at the time of a traveling road determination.

First, in the correction processing on the basis of a traveling road determination, a determination is made as to whether or not a parallel road at the matching candidate is on or below an elevated road (step ST81). More specifically, the current position calculation unit 14 determines whether or not a parallel road at the matching candidate point calculated in the step ST13 is an elevated road or a road passing beneath the elevated road that is indicated by the map information read from the map disk 2.

When it is determined in the step ST81 that the parallel road at the matching candidate is on or below an elevated road, image recognition is performed (step ST82). More specifically, the image recognition unit 19 recognizes an image pattern from the rear camera image transmitted from the rear camera 3 via the camera use mode switching unit 20, and transmits the recognized image pattern to the traveling road determination unit 26.

Next, a determination is made as to whether or not a match has been made with a different parallel road (step ST83). More specifically, the traveling road determination unit 26 detects a specific object indicating the road (an elevated road support column, for example) from the image pattern recognized in the step ST82, and determines whether or not a match has been made with a different parallel road on the basis of the detection result. When it is determined in the step ST83 that a match has not been made with a different parallel road, the correction processing on the basis of a traveling road determination is completed.

When it is determined in the step ST83 that a match has been made with a different parallel road, on the other hand, the matching position is corrected (step ST84). More specifically, the current position calculation unit 14 corrects the matching position to match the correct road indicated by the map information read from the map disk 2. The correction processing on the basis of a traveling road determination is then completed.

When it is determined in the step ST81 that the parallel road to the matching candidate is not on or below an elevated road, a determination is made as to whether or not the parallel road to the matching candidate is inside or outside a tunnel (step ST85). More specifically, the current position calculation unit 14 determines whether or not the parallel road to the matching candidate point calculated in the step ST13 is a road inside or outside a tunnel indicated by the map information read from the map disk 2.

When it is determined in the step ST85 that the parallel road to the matching candidate is inside or outside a tunnel, image recognition is performed (step ST86). More specifically, the image recognition unit 19 recognizes an image pattern from the rear camera image transmitted from the rear camera 3 via the camera use mode switching unit 20, and transmits the recognized image pattern to the traveling road determination unit 26.

Next, a determination is made as to whether or not a match has been made with a different parallel road (step ST87). More specifically, the traveling road determination unit 26 detects a specific object indicating the road (tunnel illumination, for example) from the image pattern recognized in the step ST86, and determines whether or not a match has been made with a different parallel road on the basis of the detection result. When it is determined in the step ST87 that a match has not been made with a different parallel road, the correction processing on the basis of a traveling road determination is completed. When it is determined in the step ST87 that a match has been made with a different parallel road, on the other hand, the sequence advances to the step ST84, in which the matching position is corrected as described above. The correction processing on the basis of a traveling road determination is then completed.

When it is determined in the step ST85 that the parallel road to the matching candidate is not inside or outside a tunnel, a determination is made as to whether or not the parallel road to the matching candidate is on or below a bridge (step ST88). More specifically, the current position calculation unit 14 determines whether or not the parallel road to the matching candidate point calculated in the step ST13 is a road on or below a bridge indicated by the map information read from the map disk 2. When it is determined in the step ST88 that the parallel road to the matching candidate is not on or below a bridge, the correction processing on the basis of a traveling road determination is completed.

When it is determined in the step ST88 that the parallel road to the matching candidate is on or below a bridge, on the other hand, image recognition is performed (step ST89). More specifically, the image recognition unit 19 recognizes an image pattern from the rear camera image transmitted from the rear camera 3 via the camera use mode switching unit 20, and transmits the recognized image pattern to the traveling road determination unit 26.

Next, a determination is made as to whether or not a match has been made with a different parallel road (step ST90). More specifically, the traveling road determination unit 26 detects a specific object indicating the road (a balustrade of the bridge, for example) from the image pattern recognized in the step ST89, and determines whether or not a match has been made with a different parallel road on the basis of the detection result. When it is determined in the step ST90 that a match has not been made with a different parallel road, the correction processing on the basis of a traveling road determination is completed. When it is determined in the step ST90 that a match has been made with a different parallel road, on the other hand, the sequence advances to the step ST84, in which the matching position is corrected as described above. The correction processing on the basis of a traveling road determination is then completed.

In the correction processing on the basis of a traveling road determination described above, when a parallel road exists the matching position is corrected to the correct road in accordance with a specific object indicating the road, and therefore the positioning accuracy of the navigation system can be improved.

(6) Correction Processing on the Basis of a Specific Road Site Determination

Figure 11:
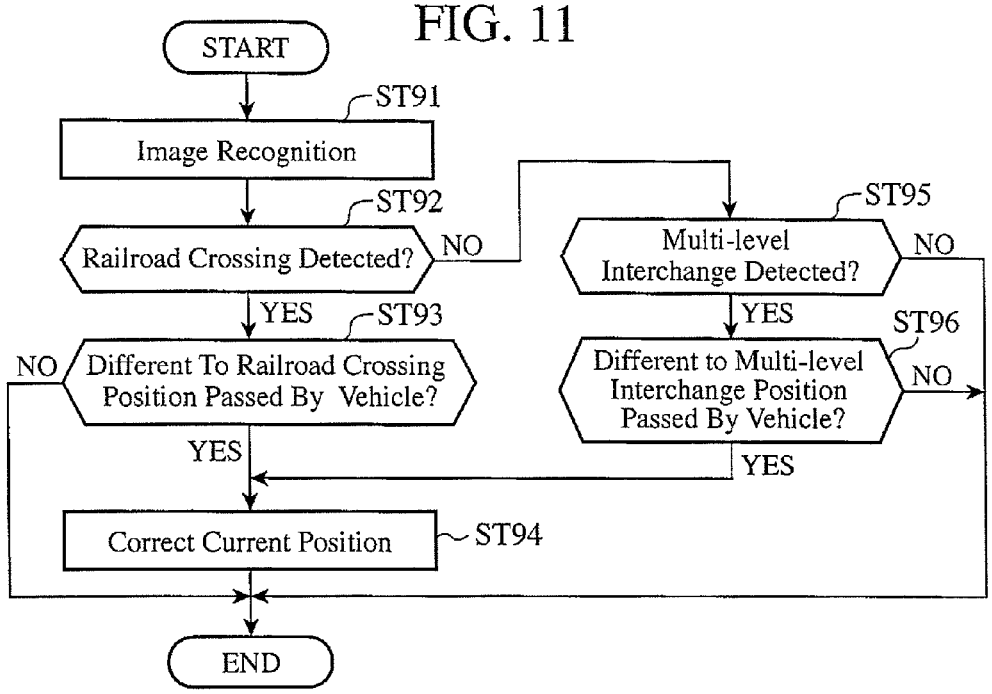
FIG. 11 is a flowchart showing in detail correction processing on the basis of a specific road site determination that is executed in the navigation system in accordance with Embodiment 1 of the present invention.

Next, the correction processing on the basis of a specific road site determination that is executed in the step ST30 of the positioning accuracy monitoring processing described above, will be described in detail with reference to a flowchart shown in FIG. 11. First, in the correction processing on the basis of specific road site determination, image recognition is performed (step ST91). More specifically, the image recognition unit 19 recognizes an image pattern from the rear camera image transmitted from the rear camera 3 via the camera use mode switching unit 20, and transmits the recognized image pattern to the specific road site determination unit 22.

Next, a determination is made as to whether or not a railroad crossing has been detected (step ST92). More specifically, the specific road site determination unit 22 determines whether or not the image pattern recognized in the step ST91 indicates a railroad crossing. When it is determined in the step ST92 that a railroad crossing has been detected, a determination is made as to whether or not a difference exists with a railroad crossing position passed by the vehicle (step ST93). More specifically, the specific road site determination unit 22 determines whether or not a difference exists between the railroad crossing indicated by the image pattern transmitted from the image recognition unit 19 and the railroad crossing position indicated by the current position information transmitted from the current position calculation unit 14.

When it is determined in the step ST93 that there is no difference with the railroad crossing position passed by the vehicle, the correction processing on the basis of a specific road site determination is completed. When it is determined in the step ST93 that there is a difference with the railroad crossing position passed by the vehicle, on the other hand, the current position is corrected (step ST94). More specifically, the current position calculation unit 14 corrects the current position of the vehicle that is calculated on the basis of the GPS information obtained from the GPS receiver included in the various sensors 1, the vehicle azimuth information obtained from the vehicle azimuth calculation unit 13, the shift position information obtained from the vehicle, and the distance information obtained from the distance measurement unit 11, to the position of the railroad crossing indicated by the map information read from the map disk 2. The correction processing on the basis of a specific road site determination is then completed.

When it is determined in the step ST92 that a railroad crossing has not been detected, a determination is made as to whether or not a multi-level interchange has been detected (step ST95). More specifically, the specific road site determination unit 22 determines whether or not the image pattern recognized in the step ST91 indicates a multi-level interchange. When it is determined in the step ST95 that a multi-level interchange has not been detected, the correction processing on the basis of a specific road site determination is completed.

When it is determined in the step ST95 that a multi-level interchange has been detected, on the other hand, a determination is made as to whether or not a difference exists with a multi-level interchange position passed by the vehicle (step ST96). More specifically, the specific road site determination unit 22 determines whether or not a difference exists between the multi-level interchange indicated by the image pattern transmitted from the image recognition unit 19 and the multi-level interchange position indicated by the current position information transmitted from the current position calculation unit 14. When it is determined in the step ST96 that there is no difference with the multi-level interchange position passed by the vehicle, the correction processing on the basis of a specific road site determination is completed.

When it is determined in the step ST96 that there is a difference from the multi-level interchange position passed by the vehicle, on the other hand, the sequence advances to the step ST94, in which the current position is corrected. More specifically, the current position calculation unit 14 corrects the current position of the vehicle that is calculated on the basis of the GPS information obtained from the GPS receiver included in the various sensors 1, the vehicle azimuth information obtained from the vehicle azimuth calculation unit 13, the shift position information obtained from the vehicle, and the distance information obtained from the distance measurement unit 11, to the position of the multi-level interchange indicated by the map information read from the map disk 2. The correction processing on the basis of a specific road site determination is then completed.

In the correction processing on the basis of a specific road site determination described above, the current position of the vehicle is corrected by detecting a specific point of a road, and therefore the positioning accuracy of the navigation system can be improved.

Figure 12:
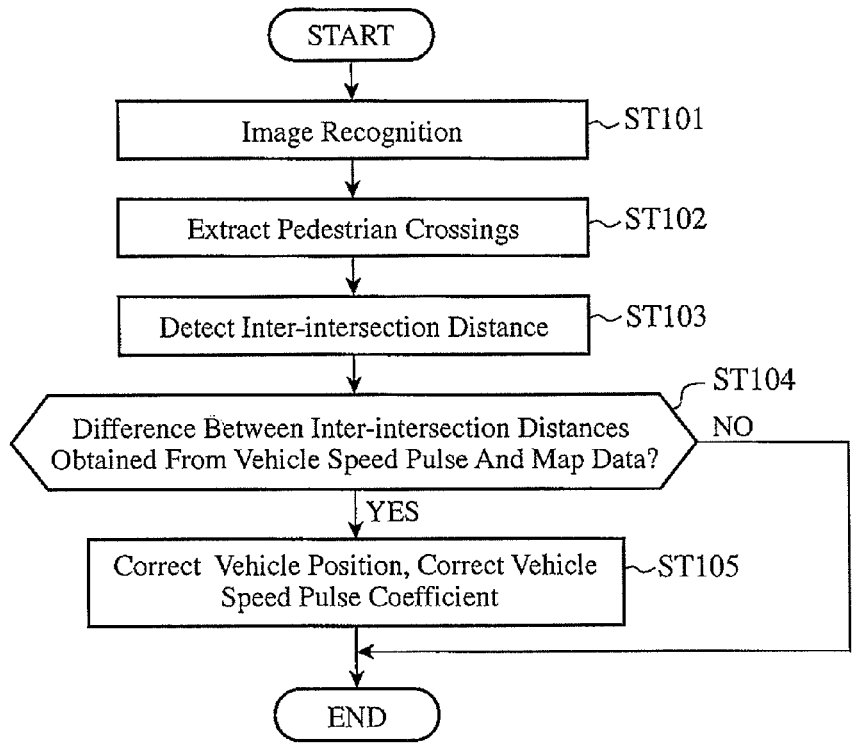
FIG. 12 is a flowchart showing in detail correction processing on the basis of an inter-intersection distance calculation that is executed in the navigation system in accordance with Embodiment 1 of the present invention.
Figure 18:
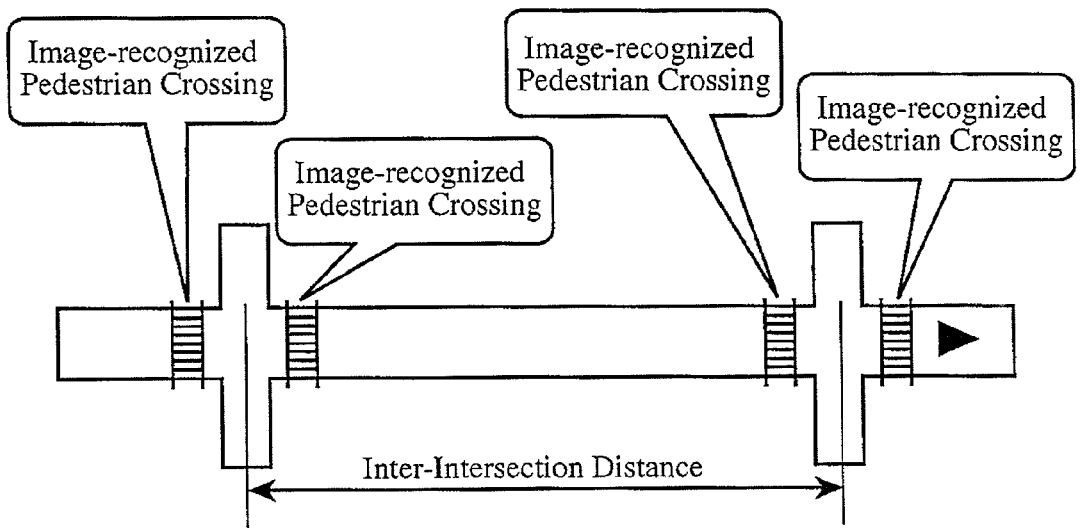
FIG. 18 is an illustrative view illustrating the correction processing on the basis of an inter-intersection distance calculation that is executed in the navigation system in accordance with Embodiment 1 of the present invention.

(7) Correction Processing on the Basis of an Inter-Intersection Distance Calculation Next, the correction processing on the basis of an inter-intersection distance calculation that is executed in the step ST31 of the positioning accuracy monitoring processing described above, will be described in detail with reference to a flowchart shown in FIG. 12 and illustrative views shown in FIGS. 17 and 18. FIG. 17 is a view showing an example of a contributing factor requiring an inter-intersection distance calculation, in which an error occurs in the current position of the vehicle when GPS non-positioning continues for a predetermined time or more, leading to a matching error.

First, in the correction processing on the basis of an inter-intersection distance calculation, image recognition is performed (step ST101). More specifically, the image recognition unit 19 recognizes an image pattern from the rear camera image transmitted from the rear camera 3 via the camera use mode switching unit 20, and transmits the recognized image pattern to the inter-intersection distance calculation unit 23. Next, pedestrian crossing extraction is performed (step ST102). More specifically, the inter-intersection distance calculation unit 23 extracts pedestrian crossings from the image pattern transmitted from the image recognition unit 19.

Next, an inter-intersection distance is detected (step ST103). More specifically, the inter-intersection distance calculation unit 23 measures a distance between intersections extracted in the step ST102 on the basis of the vehicle speed pulse information using the distance measurement unit 11. Next, a determination is made as to whether or not a difference exists between the inter-intersection distance determined from the vehicle speed pulse information and an inter-intersection distance obtained from the map data (step ST104). More specifically, the current position calculation unit 14 determines whether or not a difference exists between the inter-intersection distance determined by the distance measurement unit 11 and the inter-intersection distance calculated on the basis of the map information read from the map disk 2.

When it is determined in the step ST104 that there is no difference between the inter-intersection distance determined from the vehicle speed pulse information and the inter-intersection distance obtained from the map data, the correction processing on the basis of an inter-intersection distance calculation is completed. When it is determined in the step ST104 that there is a difference between the inter-intersection distance determined from the vehicle speed pulse information and the inter-intersection distance obtained from the map data, on the other hand, the vehicle position and the vehicle speed pulse coefficient are corrected (step ST105). More specifically, the current position calculation unit 14 corrects the current position of the vehicle in accordance with the inter-intersection distance calculated by the inter-intersection distance calculation unit 23. Further, the distance coefficient calculation unit 12 corrects the vehicle speed pulse coefficient. The correction processing on the basis of an inter-intersection distance calculation is then completed.

In the correction processing on the basis of an inter-intersection distance calculation described above, the current position of the vehicle is corrected using the inter-intersection distance, and the vehicle speed pulse coefficient is corrected. Therefore, the positioning accuracy of the navigation system can be improved.

(8) Angular Velocity Sensor Offset Voltage Correction Processing

Figure 13:
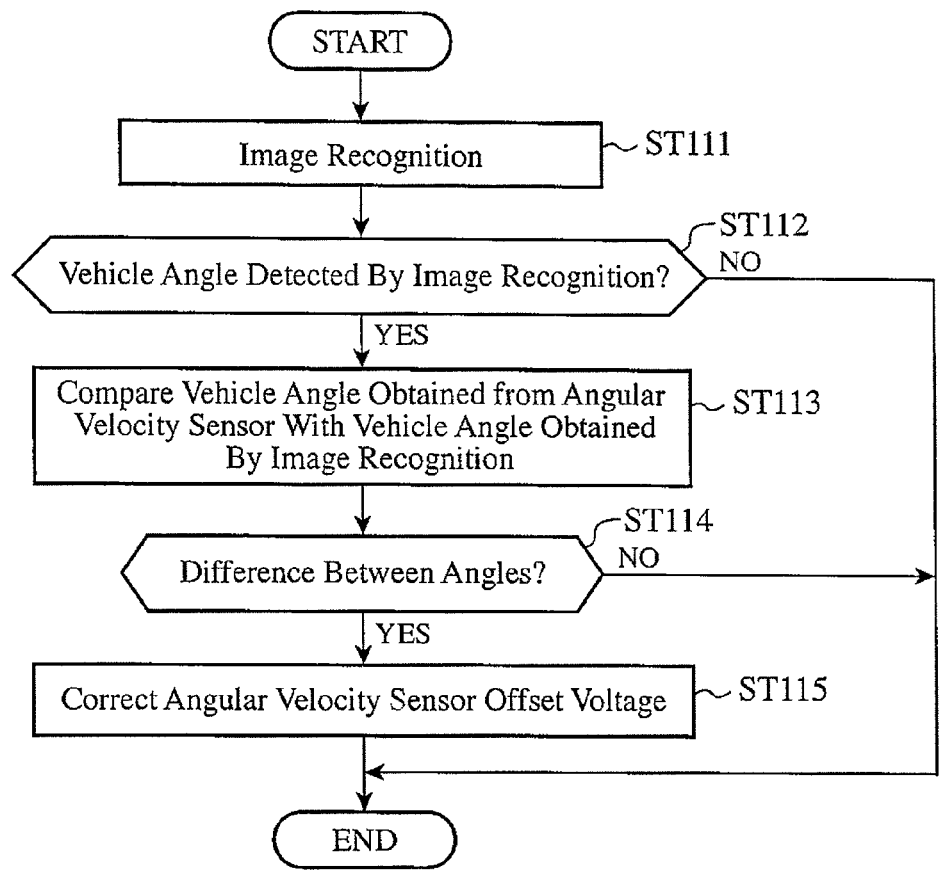
FIG. 13 is a flowchart showing in detail angular velocity sensor offset voltage correction processing that is executed in the navigation system in accordance with Embodiment 1 of the present invention.
Figure 19:
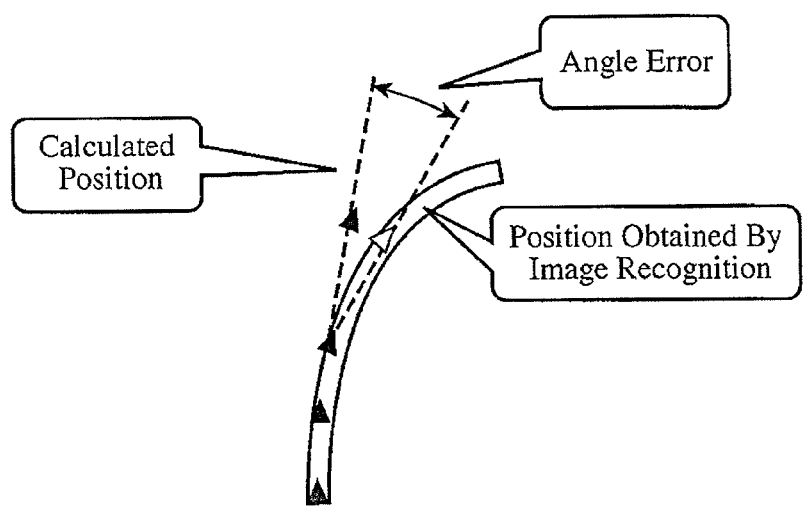
FIG. 19 is an illustrative view illustrating the angular velocity sensor offset voltage correction processing executed in the navigation system in accordance with Embodiment 1 of the present invention.

Next, the angular velocity sensor offset voltage correction processing executed in the step ST37 of the positioning accuracy monitoring processing described above will be described in detail with reference to a flowchart shown in FIG. 13 and an illustrative view shown in FIG. 19, which shows an image of the angular velocity sensor offset voltage correction processing.

First, in the angular velocity sensor offset voltage correction processing, image recognition is performed (step ST111). More specifically, the image recognition unit 19 recognizes a white line on the road on the basis of the rear camera image transmitted from the rear camera 3 via the camera use mode switching unit 20, and transmits an image pattern including the recognized white line to the offset voltage correction unit 21. Next, a determination is made as to whether or not a vehicle angle could be detected through the image recognition of the step ST111 (step ST112). More specifically, the offset voltage correction unit 21 determines whether or not an azimuth angle of the vehicle could be recognized from the image pattern including the white line transmitted from the image recognition unit 19.

When it is determined in the step ST112 that the vehicle angle could not been detected through image recognition, the angular velocity sensor offset voltage correction processing is completed. When it is determined in the step ST112 that the vehicle angle could be detected through image recognition, on the other hand, the vehicle angle obtained from the angular velocity sensor is compared to the vehicle angle obtained through image recognition (step ST113). More specifically, the offset voltage correction unit 21 compares the calculated azimuth angle of the vehicle calculated by the vehicle azimuth calculation unit 13 on the basis of the angular velocity sensor information to the azimuth angle of the vehicle calculated on the basis of the white line image pattern obtained from the image recognition unit 19.

Next, a determination is made as to whether or not a difference exists between the angles (step ST114). More specifically, the offset voltage correction unit 21 determines whether or not a difference exists between the angles compared in the step ST113. When it is determined in the step ST114 that there is no difference between the angles, or in other words that an angle error has not occurred, the angular velocity sensor offset voltage correction processing is completed. On the other hand, when it is determined in the step ST114 that there is a difference between the angles, or in other words that an angle error has occurred, as shown in FIG. 19, the offset voltage of the angular velocity sensor is corrected (step ST115). More specifically, the offset voltage correction unit 21 performs a drift correction on the gyro sensor constituting the angular velocity sensor. The angular velocity sensor offset voltage correction processing is then completed.

In the angular velocity sensor offset voltage correction processing described above, a drift correction is performed on the angular velocity sensor in accordance with an angle error between the vehicle azimuth determined by the angular velocity sensor and the vehicle azimuth determined through recognition of the image from the on-board camera, and therefore correct angular velocity sensor information can be obtained from the angular velocity sensor at all times. As a result, the positioning accuracy of the navigation system can be improved.

INDUSTRIAL APPLICABILITY

As described above, the navigation system according to the present invention is capable of correcting an offset voltage by performing a drift correction on an angular velocity sensor on the basis of an image obtained from an on-board camera, and is therefore suitable for use as an on-board navigation system requiring a high level of positioning accuracy.

The invention claimed is:
1. A navigation system comprising:
an angular velocity sensor for detecting a change in an advancement direction of a vehicle;
a vehicle azimuth calculation unit for calculating a vehicle azimuth on the basis of angular velocity sensor information obtained from said angular velocity sensor;
a global positioning system (GPS) receiver for detecting a current position of a vehicle using the GPS;

a vehicle speed sensor for detecting rotation of a vehicle wheel;
a distance measurement unit for measuring a traveled distance on the basis of vehicle speed pulse information obtained from said vehicle speed sensor;
a map information storage unit for storing map information;
a current position calculation unit for calculating a current position on the basis of GPS information obtained from said GPS receiver, vehicle azimuth information obtained from said vehicle azimuth calculation unit, and distance information obtained from said distance measurement unit, and determining a current position of a vehicle on a map by comparing said calculated current position with said map information read from said map information storage unit;
an on-board camera for shooting a periphery of said vehicle;
an image recognition unit for recognizing an image obtained from said on-board camera; and
a road deviation determination unit for determining whether or not said vehicle has deviated from a traveling road by detecting a change in the movement of traffic other than said vehicle on a periphery of said vehicle that is recognized by said image recognition unit,
wherein said current position calculation unit further corrects said determined current position of said vehicle on the basis of a specific object recognized by said image recognition unit, and
wherein said current position calculation unit further corrects said determined current position of said vehicle on the basis of said determination by said road deviation determination unit as to whether or not said vehicle has deviated from said traveling road.

2. The navigation system according to claim 1, wherein said change in the movement of said traffic other than said vehicle on said periphery of said vehicle that is detected by said road deviation determination unit indicates a longitudinal direction flow or a lateral direction flow of said traffic in an image pattern recognized by said image recognition unit.

* * * * *